Feb. 19, 1929.
S. B. BROWN
1,702,809
COMPENSATING TRUCK SPRING
Filed Oct. 11, 1926
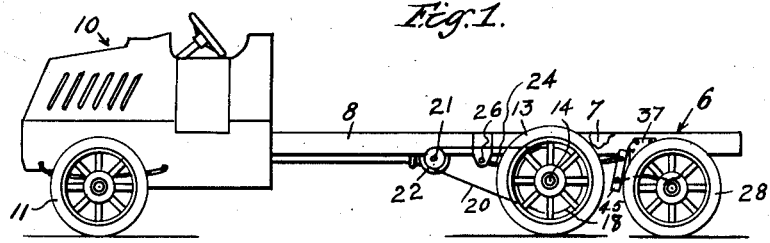
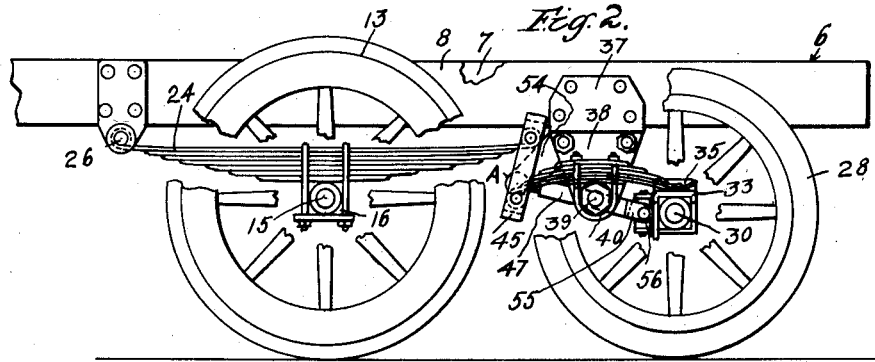
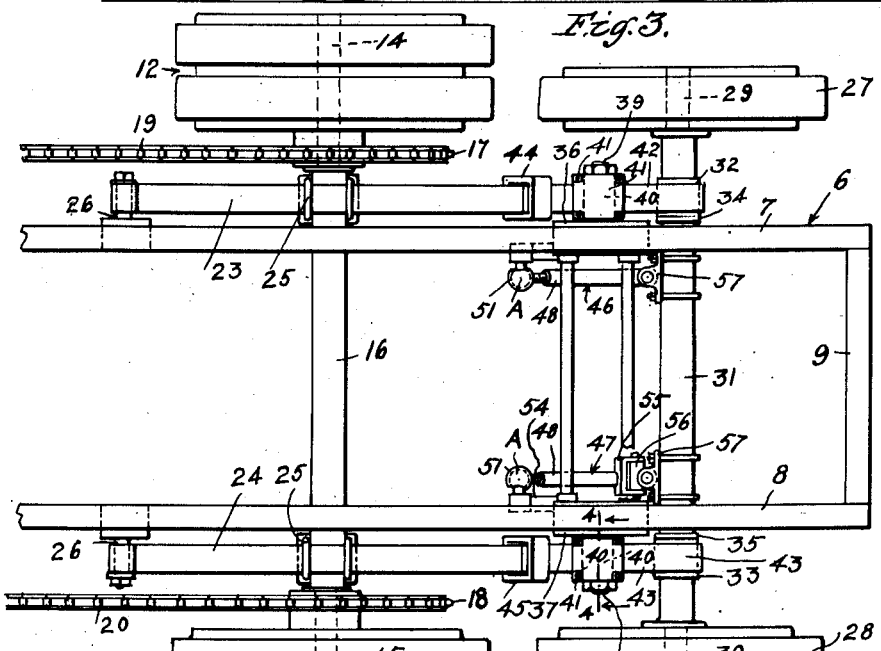
INVENTOR.
Samuel B. Brown
BY
Robt. D. Pearson
ATTORNEY.

Patented Feb. 19, 1929.

1,702,809

UNITED STATES PATENT OFFICE.

SAMUEL B. BROWN, OF LOS ANGELES, CALIFORNIA.

COMPENSATING TRUCK SPRING.

Application filed October 11, 1926. Serial No. 140,958.

This invention relates to compensating springs for auto trucks and is designed especially for use on trucks which are adapted to bear heavy loads and having a long body which necessitates the employment of six wheels to adequately support the body frame.

It is the main object of the invention to provide a simple, durable and efficient spring structure which will automatically equably distribute the strains and stresses on the vehicle wheels and compensate for the roughness of the road over which the vehicle is traveling.

Another object of the invention is to provide a structure which will serve to at all times keep the traction wheels of the vehicle firmly pressed on the road surface, in order that adequate traction will be provided when these wheels are in a hollow or on a hump and at the same time permitting the other vehicle wheels to support their portion of the load.

A further object of the invention is to provide an adjusting mechanism for the trailer wheels in order that they may be adjusted relative to the load as well as to alignment.

The above recited and other objects will be more fully disclosed in the following specification and amplified in the accompanying drawings, in which:

Figure 1 is a side elevation of a motor truck embodying the invention.

Figure 2 is an enlarged side elevation of the rear end of the truck, the wheels being broken out in order to more fully disclose the detail of the structure forming the invention.

Figure 3 is a plan view of that part of the structure shown in Figure 2.

Figure 4 is an enlarged section taken on the line 4—4 of Figure 3.

Figure 5 is an enlarged section through one of the links connecting the trailer wheels with the truck frame.

In carrying out the invention, 6 represents the truck frame which is preferably of rectangular formation and comprises the side bars 7 and 8 and the rear cross bar 9. The usual motive power, transmission apparatus and steering mechanism is located at the forward end of the truck as at 10, and the usual steering wheels 11 are also located at this end of the truck.

The traction wheels 12 and 13 are journaled on the spindles 14 and 15 of a non-rotatable rectangular transverse shaft 16 and have secured to the hubs thereof the sprockets 17 and 18 which are geared by means of the link belts 19 and 20 to the sprocket wheels 21 driven by the motor of the truck through the medium of the differential mechanism 22.

Resting upon the shaft 16 are the oppositely disposed leaf springs 23 and 24 which are clamped approximately midway between their ends to said shaft by means of the cleats 25. The forwardly extending ends of springs 23 and 24 are pivoted respectively to the side bars 7 and 8 of the frame 6 by means of the pins 26.

The trailer wheels 27 and 28 are located to the rear of the traction wheels and are journaled on spindles 29 and 30 formed on a rectangular axle 31 which has secured thereon the wear plates 32 and 33 which are provided with upwardly extending stop ledges 34 and 35 respectively.

Secured to the side bars 7 and 8 are brackets 36 and 37 provided with downwardly extending arms 38 having outwardly extending studs 39, and journaled on said studs are the sleeves 40 which are held in place by means of suitable washers and nuts, shown more clearly in Figure 4 of the drawings.

Resting upon the sleeves 40 and secured approximately midway between their ends thereto by means of the cleats 41 are the leaf springs 42 and 43. The rearwardly extending ends of the springs 42 and 43 are curved upwardly and rest respectively upon the wear plates 32 and 33 and the forwardly extending ends of said springs are respectively pivoted to the lower ends of link yokes 44 and 45 and the rearwardly extending ends of springs 23 and 24 are respectively pivoted to the upper ends of said link yokes.

By the above recited construction it will be obvious that the rear ends of springs 42 and 43 will have a sliding movement with respect to the plates 32 and 33.

The axle 31 is coupled to the frame 6 by means of the universal link members 46 and 47. The link member 47 comprises a hollow shaft 48 which is provided at its forward end with an internally threaded bore 49 for the reception of the threaded rod 50 having formed on its outer end a ball socket 51 which encompasses a ball 52 secured to a stud 53 projecting from an arm 54 formed on the bracket 37.

On the opposite or rear end of shaft 48 is formed a yoke 55 which is pivoted to a block 56 which in turn is pivoted to a fitting 57 secured to the axle 31.

The link member 46 and the manner in which it is mounted are identical with link 47 and the manner in which it is mounted, with the exception that the block 56 and its horizontal pivot are omitted, this is done in order to prevent the axle 31 from revolving or twisting.

By the above disclosed method of securing the trailer wheels to the frame it will be obvious that these wheels will be free to trail truly behind the traction wheels and will also have a limited lateral movement to avoid unnecessary bumps when striking a stone or other small obstruction and in fact will be capable of automatic adjustment to compensate with the condition of the road without in anywise twisting the body frame.

The spring members 23 and 24 are so co-related with the spring members 42 and 43 as to all times cause all of the wheels to bear a determined proportion of the load of the vehicle and the trailer wheels may independently, or together, rock on the centers marked A either upwardly or downwardly without reducing the pressure on the spring members 23 and 24, through the medium of the yoke links 44 and 45, which in turn serve to press the traction wheels down against the ground, moreover the leverage of the rearwardly extending ends of the spring members 42 and 43 increases, when the trailer wheels are elevated or lowered, due to the rocking of the springs and the wheels on different centers and to the positioning of the pivotal points of the springs 42 and 43 and the links 46 and 47 approximately in alignment, the ends of the springs sliding on the axle wear plates during this movement. It is to be understood that in Figure 2 the position of the link member 47 and of the rear spring and link 45 is that assumed when there is no load resting upon the vehicle, but that the usual load will cause the vehicle body to descend until the link 47 assumes a more nearly horizontal position, and will at the same time bring the center of the pivot stud 39 up to the same level as the upper face of plate 33. When the parts are in this position it is evident that if the trailer wheels rise or fall with relation to the traction wheels the rear ends of the springs 43 will move forwardly with respect to the plate 33 because the radius of movement of said springs, having the stud 39 for its center, is shorter than the radius of movement of the links 47 which are pivoted at A nearer the front end of the vehicle. The result of this functioning will be to lighten the portion of the load carried by the trailer wheels not only when said trailer wheels enter a depression but when they encounter a rise in the roadway.

By making the link members 46 adjustable as to length they may be lengthened or shortened as desired in order to accommodate frames of different lengths and to shift the trailer wheels more directly under the load center. Another advantage secured by making link members 46 adjustable is that in case the rear axle is accidentally bent, or the rear portion of the vehicle is otherwise damaged in such a way as to cause one of the wheels of the trailer to travel ahead of the other, by a proper adjustment of said link 46 said trailer wheels may be brought into proper transverse alinement.

Having thus described my invention what I claim is:

1. A motor truck having in combination an axle shaft, traction wheels journaled on said shaft, a pair of main springs supported on said shaft between the ends, and having one of their ends pivoted to the truck body, a trailer wheel axle disposed to the rear of said axle, trailer wheels journaled on said axle, a second pair of springs pivoted between their ends to the truck body and having one of each of their ends resting on said axle for sliding relation thereon, link members connecting the opposed free ends of said first and second mentioned springs, and adjustably extensible universal link members connecting said trailer wheel axle with the truck body.

2. A motor truck having in combination, a body, an axle, traction wheels on said axle, a pair of main springs supported on said axle between their ends, and having their front ends pivoted to the truck body, a trailer wheel axle disposed to the rear of said traction axle, trailer wheels journaled on said rear axle, a second pair of springs pivoted between their ends to the truck body and each having one of its ends supported by said rear axle to move forwardly and rearwardly in relation thereto, upwardly and downwardly extending link members connecting the opposed free ends of said first and second mentioned springs, and other link members pivotally connecting said trailer wheel axle with the truck body, the pivotal mounting of both the first and second mentioned link members being such as to cause said trailer wheels to bear a diminished amount of the load when they rise or fall with relation to said traction wheels.

3. A vehicle having a front axle, a pair of rear axles, traction wheels upon the front axle of said rear pair, trailer wheels upon the rear axle of said rear pair, springs secured intermediate their ends to the axle for said traction wheels, means for securing the front end of each of said springs to the frame of the vehicle, a rear pair of springs pivotally secured intermediate their ends to the body of the vehicle is a manner permitting a rocking movement of said rear springs, links connecting the rear ends of said front springs with the front ends of said rear springs, said links being free to rise and fall with said springs, the rear ends of said rear springs being supported by and slidable forwardly and rearwardly with respect to said rear axle, and other links pivotally secured to the trailer wheel axle and also to the body of the vehicle at points in advance of the pivot of said rear springs and where variations of the load will cause said points to move above and below the level of the pivots of said rear springs.

4. In construction of the character described, the combination with a vehicle body, an axle attached to said vehicle body, and traction wheels mounted on said axle; of a trailer wheel axle mediately connected to the vehicle body, trailer wheels on said last recited axle, a plate also mounted thereon, a pair of trailer wheel springs having rear ends supported by said plate and movable forwardly and rearwardly with relation thereto, said springs having a pivotal connection with the body of the vehicle at points in advance of said trailer wheel axle, and a pair of links having rear ends connected with said trailer wheel axle and front ends connected with the body of the vehicle in advance of the pivotal mounting of said trailer wheel springs, one of said links having a universal connection with said trailer wheel axle and the other of said links having a connection with said axle provided only with a vertical pivot.

5. In construction of the character described, the combination, with the vehicle body and traction wheels operatively connected with said body; of a trailer wheel axle mediately connected to said vehicle body, trailer wheels on said trailer wheel axle, a pair of links one at each side of the vehicle having rear ends connected with said trailer wheel axle, ball joints to operatively secure the front ends of said links to the vehicle frame, said joints each comprising a ball member and a socketed member fitting over said ball member, one of said links having a universal connection with said trailer wheel axle and the other of said links having a connection with said trailer wheel axle provided only with a vertical pivot.

In testimony whereof I affix my signature.

SAMUEL B. BROWN.